United States Patent
Salzmann et al.

(10) Patent No.: US 7,815,243 B2
(45) Date of Patent: Oct. 19, 2010

(54) ASSEMBLY CARRIER FOR INSTALLATION INTO A MOTOR VEHICLE

(75) Inventors: Michael Salzmann, Kronach (DE); Udo Taubmann, Bad Rodach-Sülzfed (DE); Harald Krüger, Bamberg (DE); Martin Schlechtriemen, Lauter (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 216 days.

(21) Appl. No.: 12/143,654

(22) Filed: Jun. 20, 2008

(65) Prior Publication Data

US 2008/0315618 A1    Dec. 25, 2008

(30) Foreign Application Priority Data

Jun. 20, 2007    (DE)    ............... 20 2007 008 829 U

(51) Int. Cl.
*B60J 5/00*    (2006.01)
(52) U.S. Cl. ................. 296/146.7; 296/146.1; 296/1.08
(58) Field of Classification Search ............... 296/39.2, 296/146.1, 146.7, 152, 154, 1.11, 1.08; 49/502; 248/466, 475
See application file for complete search history.

(56) References Cited

U.S. PATENT DOCUMENTS

| | | | |
|---|---|---|---|
| 5,902,004 A | 5/1999 | Waltz et al. | |
| 6,301,835 B1 | 10/2001 | Pfeiffer et al. | |
| 6,571,515 B1 * | 6/2003 | Samways et al. | 49/502 |
| 7,111,894 B2 * | 9/2006 | Kora et al. | 296/146.1 |
| 2001/0036559 A1 | 11/2001 | Haack et al. | |

FOREIGN PATENT DOCUMENTS

| | | |
|---|---|---|
| DE | 196 22 310 A1 | 12/1997 |
| EP | 0 974 478 B1 | 1/2000 |
| EP | 1 118 451 B1 | 7/2001 |

* cited by examiner

*Primary Examiner*—Lori L Lyjak
(74) *Attorney, Agent, or Firm*—Christie, Parker & Hale LLP

(57) ABSTRACT

An assembly carrier for installation into a motor vehicle includes a large-area carrier body molded at least partially from fiber-reinforced plastic, fastening points, which are provided on the carrier body, for fastening functional components of a motor vehicle to the carrier body, and a gate mark which projects from the carrier body and which represents a section of the path along which the molding compound for molding the assembly carrier was conducted into a cavity, which forms the carrier body, of a molding die. The gate mark has at least one longitudinally extended gate section which is curved in cross section through the carrier body and the gate mark and whose longitudinal sides which are situated opposite, and which face away from, one another run in each case along a curved path and merge in each case along the respective path into the carrier body.

35 Claims, 2 Drawing Sheets

ASSEMBLY CARRIER FOR INSTALLATION INTO A MOTOR VEHICLE

CROSS-REFERENCE TO RELATED APPLICATION

This application claims priority of Gernam Utility Model Application Number 20 2007 008 829.9, filed on Jun. 10, 2007.

BACKGROUND

The invention relates to an assembly carrier for installation into a motor vehicle.

An assembly carrier of said type, which can be provided in particular for integration into a motor vehicle door, comprises a large-area carrier body which is molded (injection molded) at least partially from fiber-reinforced plastic; said assembly carrier also comprises fastening points, which are provided on the carrier body, for fastening functional components of a motor vehicle to the carrier body, for example for fastening functional components of a motor vehicle door, such as a window lifter, a door lock, a side airbag module and the like; and a gate mark which projects from the carrier body and which represents a section of the path along which a plasticized molding compound for molding the assembly carrier was conducted into a molding die which defines (forms) the carrier body.

Here, a large-area carrier body is to be understood in the present case to mean a carrier body whose areal extent is considerably greater than its width (thickness) transversely with respect to the areal extent. A carrier body of said type can be produced by means of molding, in particular injection molding, in a mold, by virtue of a plurality of die parts which form the mold being moved together such that a cavity is formed between the die parts, by virtue of a molding compound composed of a plasticized fiber-reinforced plastic being introduced, and a carrier of the desired shape being generated as a result of the solidification of the molding compound in the cavity.

Supply ducts serve to supply the molding compound to the cavity formed in the mold, through which supply ducts the plasticized molding compound flows into the cavity in which it subsequently solidifies so as to create the desired carrier body. When the mold is opened after the solidification of the molding compound in order to remove the carrier body, so-called gate marks remain in the transition region from the cavity provided for forming the carrier body to the adjoining supply ducts, which gate marks represent an end section of the respective duct through which the molding compound has been introduced into each cavity along a path defined by the profile of each duct.

An assembly carrier of said type formed by a large-area carrier body can, as a so-called door module carrier, and before assembly into a motor vehicle door, be fitted with functional components of the door such as for example a window lifter, a door lock and a side airbag module, and can subsequently be installed into a motor vehicle door as a completely pre-manufactured door module together with the functional components which have been pre-mounted on said door module carrier and if appropriate pre-tested. On the other hand, the assembly carrier can also be integrated into a motor vehicle door before being fitted, at the fastening points provided for the purpose, with functional components of the vehicle door. In both cases, the assembly carrier ultimately forms a constituent part of the door structure of a motor vehicle, in particular the so-called inner door skin which separates the wet space from the dry space of a motor vehicle door.

In the production of an assembly carrier of said type by means of molding, in particular injection molding, there is the problem primarily when using relatively long fibers can break at the transition from the supply ducts into the cavity, and the stability of the assembly carrier is thereby adversely affected.

SUMMARY

The invention is therefore based on the problem of improving an assembly carrier of the type specified in the introduction with regard to the possible use also of relatively long fibers for reinforcing the assembly carrier.

According to an exemplary embodiment of the invention, the gate mark has at least one longitudinally extended gate section which is curved—in cross section through the carrier body and the gate mark—and whose two longitudinal sides (formed as delimiting surfaces) run in each case along a curved path and merge in each case along the respective curved path into the carrier body. Here, the two longitudinal sides of the gate section each run for example at least partially along a circular path in cross section.

With a gate geometry of said type, it is possible for a uniform, smooth transition of the reinforcing fibers which are added to the molding compound (plasticized plastic) to take place, such that the risk of fracture of the fibers is avoided. This permits in particular the use of preferably long reinforcing fibers (for example glass fibers or carbon fibers) with a length of more than 2 mm, in particular with a length of from 3 mm to 7 mm, and even with lengths of more than 10 mm, in the plastic provided for producing the assembly carrier, without the fibers breaking during production.

For this purpose, it is provided exemplary that the one longitudinal side of the gate section merges into a first surface, which is referred to as an upper side, and the other longitudinal side of the gate section merges into the lower side, which is situated opposite and faces away from said upper side, of the carrier body, with the upper and lower sides of the assembly carrier extending in each case over a large area, that is to say in each case spanning an area which is large in relation to the thickness of the assembly carrier, and with the two longitudinal sides having the same direction of curvature in cross section, such that the tangents of sections, which are situated opposite one another, of the longitudinal sides run in each case substantially parallel to one another.

Here, it is advantageous for the longitudinal sides of the gate section to merge in each case continuously, that is to say without a step or sharp corner, into the associated side of the assembly carrier.

The features specified above in relation to a cross section through the carrier body of the assembly carrier in the region of a gate mark can be realized for an actual three-dimensional realization of the gate mark in that the gate mark is formed so as to be rotationally symmetrical with respect to an axis of symmetry, in particular with respect to an axis of symmetry which runs substantially perpendicular to the plane spanned by the carrier body.

Here, an end section of the gate mark which is spaced apart from the carrier body can be formed as a solid body, while that gate section of the gate mark which faces toward and merges into the carrier body has a cutout which is advantageously likewise designed so as to be rotationally symmetrical with respect to an axis of symmetry, in particular with respect to an axis which runs perpendicular to the carrier body or the plane spanned by said carrier body.

The cutout is open toward that side of the gate section which faces away from the end section, which is formed as a solid body, of the gate mark, that is to sat at that end side of the gate section at which the latter merges into the carrier body of the assembly carrier. Conversely, the cutout tapers toward that end section of the gate mark which faces away from the carrier body, and ends at the start of said end section.

According to one exemplary variant of the invention, the gate mark is formed entirely in front of a surface or a side, for example the upper side, of the carrier body, that is to say both the end section and also the gate section are situated in front of that upper side of the carrier body.

According to another exemplary variant of the invention, one part of the gate mark extends in front of a first surface (for example the upper side) of the carrier body, in particular the end section of the gate mark, while another part of the gate mark, in particular the gate section thereof, is situated in front of the other surface (lower side) of the carrier body. With said second variant of the invention, it is possible to realize smaller structural heights, since the gate mark projects only by a comparatively small amount in front of each side of the assembly carrier.

BRIEF DESCRIPTION OF THE DRAWINGS

Physical specifications of relevant dimensions of the gate mark, in particular of the gate section and of the end section of the gate mark, are given in the dependent claims and are explained in more detail below on the basis of the figures, in which:

FIG. 3 illustrates a door structure ST of a motor vehicle door, which comprises a frame R which defines a window opening O, a door sill BR which terminates the window opening O in the downward direction, and an inner door skin I which extends below the door sill BR. The inner door skin I is provided with a large-area cutout A which can be covered by means of an assembly carrier 1 in the form of a door module carrier.

Figure 3:
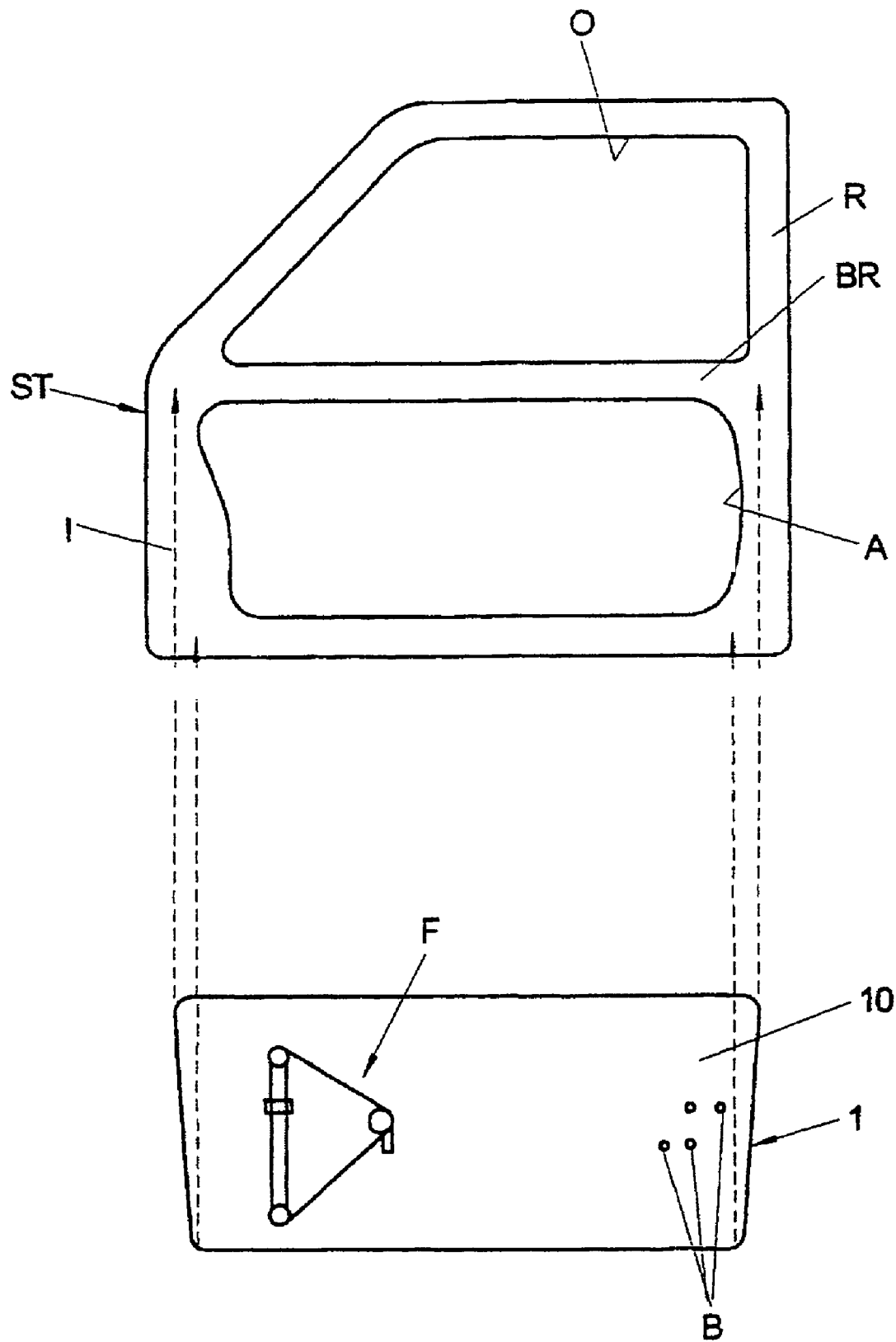
FIG. 3 shows an assembly carrier for a motor vehicle door.

The assembly carrier 1 is formed by a large-area carrier body 10 on which are provided a plurality of fastening points B (of which some are shown in FIG. 3 by way of example) in order to be able to arrange and fix functional components of a motor vehicle door, such as for example the window lifter F schematically indicated in FIG. 3, a door lock, a side airbag module, an audio loudspeaker, cable strands and the like, on the carrier body 10 of the assembly carrier 1. The assembly carrier 1, together with the functional components which have been pre-mounted thereon and if appropriate pre-tested with regard to their function, is then installed into the door structure S such that said assembly carrier 1 covers the large-area cutout A of the inner door skin I and is fastened to the inner door skin I at the edge of said cutout A. The assembly carrier 1 then forms a constituent part of the inner door skin I, which typically separates the so-called wet space from the dry space of a motor vehicle door.

The window lifter F which is provided on the assembly carrier 1 then serves for raising and lowering a window pane with which the window opening O of the door structure S can be closed off.

Door constructions of said type with an assembly carrier formed as a door module carrier are known, such that reference is made by way of example to DE 196 22 310 A1 for further details.

As an alternative to the design of the assembly carrier 1 as a door module carrier which is installed into a motor vehicle door only after the functional components to be arranged thereon have been pre-mounted, the assembly carrier 1 can also be a carrier which is to be integrated directly into the door structure S and is only thereafter fitted with the associated functional components.

An assembly carrier 1 of said type or its carrier body can, in a lightweight design, be composed in particular of plastic, wherein fibers such as for example glass fibers or carbon fibers can be integrated into the plastic to provide reinforcement. This is significant in order to make the assembly carrier capable of absorbing relatively large forces, which can occur for example on the window lifter F during operation, and of transmitting said forces into the door structure S.

To produce an assembly carrier of said type composed of fiber-reinforced plastic by means of primary forming, that is to say in particular molding and in particular injection molding, a cavity (cavity of a molding die) which represents the shape of the assembly carrier to be produced is filled with the plasticized fiber-reinforced plastic as molding compound, which subsequently solidifies in said cavity and thereby forms the assembly carrier.

During the primary forming or molding of the assembly carrier 1, or more precisely of the carrier body 10 of the assembly carrier 1, the molding compound used for this purpose is conducted in the form of a fiber-reinforced, plasticized plastic into the cavity of the molding die through supply ducts of said molding die which are provided for this purpose. After the molding compound has solidified and the assembly carrier 1 has thereby been finished, so-called gate marks remain on its carrier body 10, which gate mark represent the transition from the cavity to those supply ducts. From the gate marks, it is therefore possible to identify the path along which the plasticized molding mass has flowed into the cavity in order to fill the latter.

Below, it is explained on the basis of two exemplary embodiments illustrated in FIGS. 1 and 2 how a gate mark of said type can be advantageously configured such that, during the filling of the cavity of a molding die, the risk of breakage of the fibers which are integrated into the molding compound and which serve for reinforcement in minimized. Said risk consists in particular in the use of particularly long glass, carbon or other fibers with a length of more than 2 mm, wherein lengths of up to 12 mm can also occur, in particular with a length of the fibers of between 3 mm and 7 mm.

Figure 1:
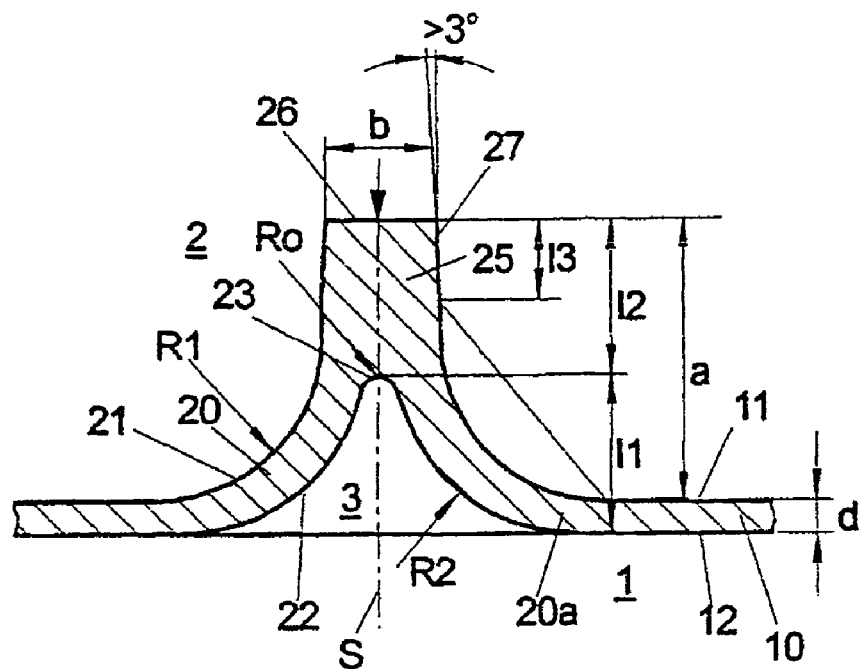
FIG. 1 shows a first exemplary embodiment of the design of a gate mark of an assembly carrier for a motor vehicle door, in cross section.
Figure 2:
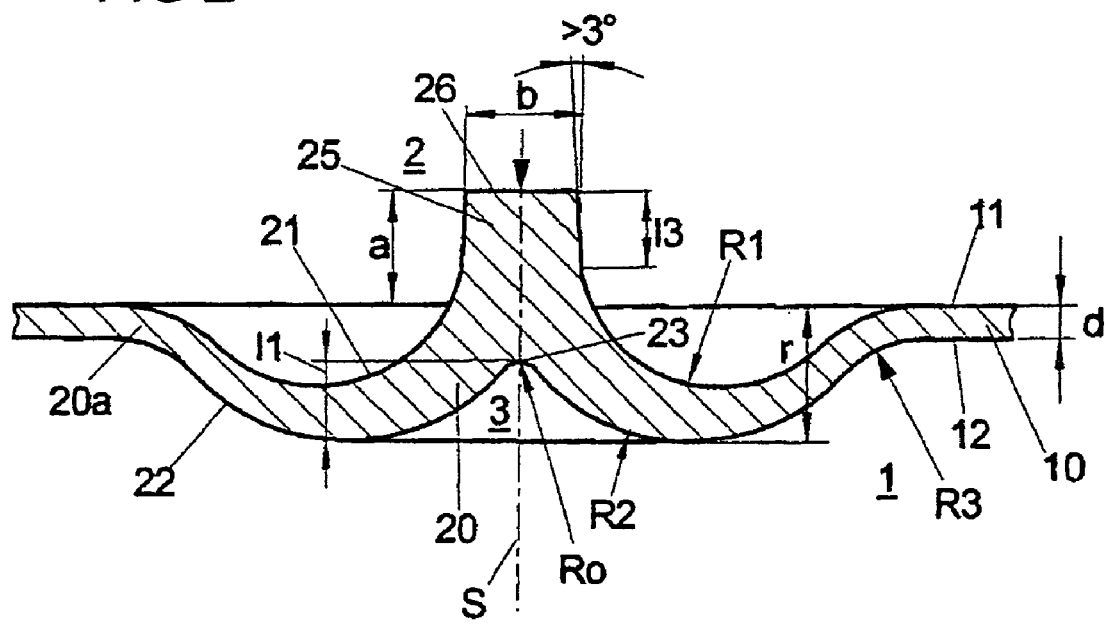
FIG. 2 shows a second exemplary embodiment of the design of agate mark of an assembly carrier for a motor vehicle door, in cross section.

In order to reduce the risk of breakage of fibers of said type during the filling of the cavity of a molding die, a uniform smooth transition, which runs along a curved path, of the respective gate mark into the carrier body of the assembly carrier is provided in FIGS. 1 and 2.

FIG. 1 shows a cross section (transversely with respect to the plane spanned by the carrier body 10 of the assembly carrier 1) in the region of a gate mark 2 which projects from the carrier body 10 of the assembly carrier 1. The gate mark 2 is formed so as to be rotationally symmetrical with respect to an axis of symmetry S which rums substantially perpendicular to the plane spanned by the carrier body 10 of the assembly carrier 1.

The large-area carrier body 10, which spans a plane, in FIG. 3 has, as per FIG. 1, two surfaces 11, 12 which extend along said plane and which are situated opposite and face away from one another, which surfaces 11, 12 are referred to below as an upper side 11 and lower side 12. The spacing d between the upper and lower sides 11, 12 of the carrier body 10 defines the thickness of the latter in the region of the gate mark 2.

At its end section 25 facing away from the carrier body 10 of the assembly carrier 1, the gate mark 2 is formed as a solid body which is rotationally symmetrical about that axis S, the encircling side wall 27 of which solid body is inclined with respect to that axis S by a small angle, in particular an angle of at least 3°, such that the end section 25 has the tendency to taper toward its free end 26 (demolding angle).

The end section 25, which is formed as a solid body, of the gate mark 2 preferably has, at its free end 26, a diameter, also referred to here as the width b, of at least 1.5*d, wherein d refers to the thickness of the carrier body 10 in the region of the gate mark 2. The width b is particularly preferably in the range between four and five times the thickness d of the carrier body 10 in the region of the gate mark 2.

In the direction of the carrier body 10, the end section 25 of the gate mark 2 is adjoined by a gate section 20 which—like a cutout 3 which is formed in said gate section 20—is formed so as to be rotationally symmetrical with respect to the axis of symmetry S.

The length l2 of the end section 25 of the gate mark 2, that is to say the spacing between the free end 26 of the end section 25 and the start of the gate section 20 which adjoins the end section 25, represented here by that end 23 of the cutout 3 which faces toward the end section 25, is approximately six times the thickness d of the carrier body 10, in front of which the gate mark 2 is arranged, is preferably more then ten times the thickness d, in particular more then thirteen times said thickness d.

In cross section, the gate section 20, as can be seen from FIG. 1, forms a longitudinally extended, curved guide path whose two longitudinally sides 21, 22 each have the same direction of curvature, with the one longitudinal side 21 merging into the upper side 11 of the carrier body 10 and the other, opposite longitudinal side 22 merging into the lower side 12 of the carrier body 10 and the other, opposite longitudinal side 22 merging into the lower side 12 of the carrier body 10, and with the spacing of the longitudinal sides 21, 22 of the gate section 20 decreasing from the end section 25 of the gate mark 2 toward the carrier body 10.

The curved design of the longitudinal side 21 (side or delimiting surface), which merges into the upper side 11 of the carrier body 10, extends into the end section 25, which is formed as a solid body, of the gate mark 2, such that only an upper part of said end section 25 runs inclined with respect to the axis of symmetry S at the above-explained angle. The length of said upper part of the end section 25, that is to say the extent of the latter parallel to the axis of symmetry S, is up to ten times the thickness d of the carrier body 10 in the region of the gate mark 2.

Of the curved longitudinal sides 21, 22, one longitudinal side 21 (which merges into the upper side 11 of the carrier body 10) faces away from the cutout 3 while the other longitudinal side 22 (which merges into the lower side 12 of the carrier body 10) adjoins said cutout 3. As viewed from the cutout 3, the two longitudinal sides 21, 22 of the gate section 20 are convexly curved, while said longitudinal sides 21, 22 are concavely curved as viewed from the end section 25 of the gate mark 2.

The two longitudinal sides 21, 22 of the gate section 20 thus merge in each case uniformly and in particular continuously, that is to say without any discontinuities, into the respectively associated surface 11 or 12 of the carrier body 10.

Here, it can be provided that the delimiting surfaces are curved in cross section, as illustrated in FIG. 1, along a circular path. In this case, the radius of curvature R1 of the delimiting surface 21 which faces away from the cutout 3 and which merges into the upper side 11 of the carrier body is preferably at least tow times the thickness d of the carrier body 10 in the region of the gate mark 2, in particular more than ten times, and the radius of curvature R2 of the other delimiting surface 22 which adjoins the cutout 3 and which merges into the lower side 12 of the carrier body 10 is at least 1.5 times, and advantageously at most ten times, in particular at most eight times, said thickness d.

Said length l1 of the gate section 20 along the axis of symmetry S is finally at least two times, in particular six times, the thickness d of the carrier body 10 in the region of the gate mark 2, with said length l1 being defined as the spacing along the axis of symmetry S between the end-section-side end 23 of the cutout 3 and the lower side 12 of the carrier body 10 into which the cutout 3 opens out.

Here, the end-section-side end 23 of the cutout 3 is preferably of curved design, in particular so as to run along a circular path in cross section, with the radius of curvature Ro advantageously being at least 0.5 times the thickness d of the carrier body 10 in the region of the gate mark 2, and in particular in the range between said thickness d and two times said thickness 2*d. By means of the design, described on the basis of FIG. 1, of the gate mark 2 which represents the guide path along which plasticized molding compound is supplied to the cavity (cavity of a molding die) which is provided for forming the carrier body 10, during the molding of the carrier body 10 of the assembly carrier 1, a uniform, smooth transition of the molding compound from the guide duct into the cavity is ensured, such that a breakage of fibers which are integrated into the molding compound is prevented. In particular, the fibers are rotated smoothly along the curved guide path of the gate section 20 into the main direction of alignment of the carrier body 10, such that relatively long fibers pass undamaged into the cavity as a constituent part of the molding compound, and an improved level of strength of the assembly carrier 1 is in this way ensured.

FIG. 2 illustrates a modification of the gate mark 2 from FIG. 1, with the only significant difference being that, in FIG. 2, the gate mark 2 is arranged not only in front of that surface of the carrier body 10 which is referred to as the upper side 11, as is the case in FIG. 1. In face, in the exemplary embodiment illustrated in FIG. 2, substantially only that end section 25 of the gate mark 2 which is formed as a solid body is arranged in front of the upper side 11 of the carrier body 10, while the gate section 20 which merges along a curved, areal path into the carrier body 10 is situated in from of the other surface, referred to as the lower side 12, of the carrier body 10.

In this way, the gate section 20 has a different curvature direction of in an end region 20a which merges into the carrier body 10 than in its region which proceeds from the end section 25 and in which the two longitudinal sides 21, 22 have the same direction of curvature.

Here, the radius of curvature R1 of the longitudinal; side 21 which merges into the upper side 11 of the carrier body 10 is preferably at least two times the thickness d of the carrier body 10 in the region of the gate mark 2, in particular more than five times said thickness d, and the other side surface 22 which adjoins the cutout 3 and which merges into the lower side 12 of the carrier body 10 has in particular a radius of curvature R2 of at least 1.5 times said thickness d, with said radius of curvature R2 advantageously being at most eight times, in particular at most five times, said thickness d.

In the end region 20a in which the gate section 20 merges into the carrier body 10 and the curvature runs oppositely to the curvature in the other regions of the gate section 20, such that said end region 20a is convexly curved as viewed from that end section 25 of the gate mark 2 which is formed as a solid body, the radius of curvature R3 is advantageously at least two times, in particular at least five times, the thickness d of the carrier body 10 in the region of the gate mark 2.

The spacing a between the free end 26 of the end section 25, which is formed as a solid body, and the upper side 11 of the carrier body 10 along the axis of symmetry S is advantageously at least two times the thickness d of the carrier body 10 in the region of the gate mark 2 and can in particular be in the range of five times said thickness d.

The rear spacing r of the opening-out point of the cutout 3, which opening-out point is situated in front of the lower side 12 of the carrier body 10, from the upper side 11 of the carrier body 10 is likewise advantageously at least two times, for example 4.5 times, the thickness d of the carrier body 10 in the region of the gate mark 2.

Here, the length 11 of the cutout 3 along the axis of symmetry S is at least equal to the thickness d of the carrier body 10 in the region of the gate mark 2 and can for example be 3 times said thickness d.

With the modifications of the gate mark from FIG. 1 described in FIG. 2, which is likewise designed so as to be rotationally symmetrical about an axis of symmetry S, it is possible to obtain a small structural height of the arrangement (perpendicular to the plane spanned by the carrier body 10), wherein the projection caused by the gate mark 2 is also distributed uniformly between the upper side 11 and the lower side 12, that is to say the two surfaces of the carrier body 10.

Where individual regions and dimensions of the gate mark 2 have not been explained in any more detail on the basis of FIG. 2, then reference is made in this regard to the statements made regarding FIG. 1, with in each case the same reference symbols being used for identical or corresponding regions of the gate mark 2 in FIGS. 1 and 2.

Furthermore, a gate mark 2 of the above-described type can be utilized to form a screw-on dome or some other fastening point on an assembly carrier. For this purpose, the cutout 3 of the gate section 20 can for example be designed as a threaded hole or else as a through hole (for guiding a rod or cable). Here, however, the loads which can act on a fastening point of said type must be taken into consideration.

The invention claimed is:

1. An assembly carrier for installation into a motor vehicle, the assembly carrier comprising:
   a large-area carrier body;
   fastening points on the carrier body for fastening functional components of a motor vehicle to the carrier body;
   a gate mark projecting from the carrier body, the gate mark including at least one longitudinally extended gate section curved in cross section through the carrier body and the gate mark, wherein the gate section comprises opposing longitudinal sides facing away from one another, and wherein each of the longitudinal sides extends along a curved path and merges along the respective path into the carrier body;
   wherein the carrier body is molded with a molding die from a molding compound at least partially comprising fiber-reinforced plastic; and
   wherein the gate mark is defined by a section of a path along which the molding compound was conducted into a cavity of the molding die.

2. The assembly carrier of claim 1, wherein the assembly carrier is configured for integration into a motor vehicle door, such that the assembly carrier, in the installed state, forms a constituent part of a door structure.

3. The assembly carrier of claim 1, wherein the carrier body has a first surface defining an upper side, and a second surface opposite said first surface defining a lower side.

4. The assembly carrier of claim 3, wherein one of the longitudinal sides of the gate section merges into the upper side and the other longitudinal side of the gate section merges into the lower side of the carrier body.

5. The assembly carrier of claim 1, wherein each of the longitudinal sides of the gate section merges continuously into the carrier body in a transition region.

6. The assembly carrier of claim 1, wherein the two longitudinal sides of the gate section have the same direction of curvature in cross section.

7. The assembly carrier of claim 1, wherein the gate section is formed so as to be rotationally symmetrical with respect to an axis of symmetry.

8. The assembly carrier of claim 7, wherein the axis of symmetry is aligned substantially perpendicular to a plane spanned by the carrier body.

9. The assembly carrier of claim 1, wherein the gate mark has an end section spaced apart from the carrier body and formed as a solid body.

10. The assembly carrier of claim 9, wherein the gate section is formed so as to be rotationally symmetrical with respect to an axis of symmetry, and wherein the end section of the gate mark is formed so as to be rotationally symmetrical with respect to the axis of symmetry.

11. The assembly carrier of claim 1, wherein a cutout is provided in the gate section of the gate mark.

12. The assembly carrier of claim 11, wherein the gate section is formed so as to be rotationally symmetrical with respect to an axis of symmetry, and wherein the cutout is formed so as to be rotationally symmetrical with respect to the axis of symmetry.

13. The assembly carrier of claim 11, wherein the cutout is open at its side facing away from an end section of the gate mark.

14. The assembly carrier of claim 11, wherein the cutout tapers toward an end section of the gate mark.

15. The assembly carrier of claim 11, wherein the cutout ends at a transition of the gate section to an end section of the gate mark.

16. The assembly carrier of claim 11, wherein the longitudinal sides of the gate section are convex at least in regions as viewed from the cutout.

17. The assembly carrier of claim 9, wherein the longitudinal sides of the gate section are concave at least in regions as viewed from the end section of the gate mark.

18. The assembly carrier of claim 1, wherein the longitudinal sides of the gate section extend at least in regions along a circular path in cross section.

19. The assembly carrier of claim 1, wherein a spacing of the longitudinal sides of the gate section reduces in a direction of the carrier body.

20. The assembly carrier of claim 3, wherein the gate mark is situated in front of one of the surfaces of the carrier body.

21. The assembly carrier of claim 3, wherein the gate mark is situated partially in front of the one of the surfaces and partially in front of the other surface of the carrier body.

22. The assembly carrier of claim 1, wherein the assembly carrier is at least partially molded from plastic, and wherein at least one of glass fibers or carbon fibers reinforce the plastic.

23. The assembly carrier of claim 22, wherein at least some of the fibers have a length of more than 2 mm.

24. The assembly carrier of claim 23, wherein at least some of the fibers have a length of between 3 mm and 7 mm.

25. The assembly carrier of claim 22, wherein the fibers have a length of at most 12 mm.

26. The assembly carrier of claim 1, wherein the carrier body has a defined thickness in the vicinity of the gate mark.

27. The assembly carrier of claim 26, wherein a diameter of the end section of the gate mark at its free end facing away from the carrier body is at least 1.5 times the thickness.

28. The assembly carrier of claim 27, wherein the diameter is at least four times the thickness.

29. The assembly carrier of claim 26, wherein a radius of curvature of the longitudinal sides merging into an upper side of the carrier body, of the gate section is at least two times the thickness.

30. The assembly carrier of claim 29, wherein the radius of curvature is at least five times the thickness.

31. The assembly carrier of claim 26, wherein a radius of curvature of the longitudinal sides merging into a lower side of the carrier body, of the gate section is at least 1.5 times the thickness.

32. The assembly carrier of claim 31, wherein the radius of curvature is at most eight times the thickness.

33. The assembly carrier of claim 26, wherein a cutout is provided in the gate section of the gate mark, and wherein a length of the cutout transversely with respect to a plane spanned by the carrier body is at least equal to the thickness.

34. The assembly carrier of claim 33, wherein the length is at least equal to three times the thickness.

35. The assembly carrier of claim 1, wherein the carrier body has a defined thickness in a region where the gate section merges into the carrier body.

* * * * *